(12) United States Patent (10) Patent No.: US 7,596,272 B2
Sternby (45) Date of Patent: Sep. 29, 2009

(54) HANDLING OF DIACRITIC POINTS

(75) Inventor: Jakob Sternby, Lund (SE)

(73) Assignee: Zi Decuma AB, Lund (SE)

( * ) Notice: Subject to any disclaimer, the term of this patent is extended or adjusted under 35 U.S.C. 154(b) by 594 days.

(21) Appl. No.: 11/364,742

(22) Filed: Feb. 28, 2006

(65) Prior Publication Data

US 2006/0193519 A1 Aug. 31, 2006

(30) Foreign Application Priority Data

Feb. 28, 2005 (SE) .................................... 0500466

(51) Int. Cl.
*G06K 9/18* (2006.01)
(52) U.S. Cl. ..................................... 382/186
(58) Field of Classification Search ................ 382/173, 382/181, 186–187, 190, 201, 209, 218
See application file for complete search history.

(56) References Cited

U.S. PATENT DOCUMENTS

| 6,202,060 B1 * | 3/2001 | Tran ............................... 707/3 |
| 6,339,655 B1 * | 1/2002 | Aharonson et al. ........... 382/186 |
| 6,738,519 B1 * | 5/2004 | Nishiwaki .................... 382/228 |

* cited by examiner

*Primary Examiner*—Daniel G Mariam
(74) *Attorney, Agent, or Firm*—Michael A. Glen; Glenn Patent Group

(57) ABSTRACT

A method for recognition of a handwritten pattern comprises selecting core points among a sequence of detected points of the handwritten pattern. The core points are selected for use in segmenting and recognizing the handwritten pattern. The method may further comprise identifying potential diacritics in the sequence of points of the handwritten pattern, determining features of each core point, assigning at least one feature associated with identified potential diacritics to each core point of a subset of core points, and comparing the handwritten pattern to templates.

24 Claims, 6 Drawing Sheets

HANDLING OF DIACRITIC POINTS

CROSS-REFERENCE TO RELATED APPLICATION

This application claims the benefit of priority to Swedish patent application number 0500466-8, filed on Feb. 28, 2005.

TECHNICAL FIELD

The present invention relates to a method for recognition of a handwritten pattern comprising one or more curves representing a plurality of symbols.

BACKGROUND OF THE INVENTION

Today, handwriting is becoming an increasingly popular method for inputting data to data handling units, especially to mobile phones and Personal Digital Assistants (PDAs). In order to handle the inputted data, the handwriting must be recognized and interpreted. Most existing methods for recognizing handwriting require that the characters that are to be inputted are written one by one and are separately recognized. An example of such a method is provided in U.S. Pat. No. 4,731,857, but a commonly known example is Graffiti®, manufactured by Palm, Inc.

In order to speed up input of data it is desired that cursive handwriting is allowed. However, recognition of cursive handwriting is more complex than recognition of separate characters. The increase in complexity for cursive handwriting recognition may be attributed to the problem of segmenting connected characters, i.e. to identify the transition from one character to another within the handwritten pattern. Errors in cursive handwriting recognition may hence come in two levels, that is errors in segmentation and errors in recognition of the separated characters, which greatly complicate the construction of a lucid sequential recognition system.

Methods for recognition of cursive handwriting generally suffer from the problem that there are many possible segmentations between adjacent characters, which results in a large number of possible segmentations of a handwritten pattern.

Most commercial systems today employ complicated statistical systems using neural networks and hidden markov models with integrated dictionaries. Examples of such systems are presented in P. Neskovic and L. Cooper, "Neural network-based context driven recognition of on-line cursive script", *Seventh International Workshop on Frontiers in Handwriting Recognition Proceedings*, p. 352-362, September 2000 and M. Schenkel and I. Guyon, "On-line cursive script recognition using time delay networks and hidden Markov models", *Machine Vision and Applications*, vol. 8, pages 215-223, 1995. A problem with these systems is that they are large and require large training sets. Furthermore they are highly dependent on the dictionary used.

SUMMARY OF THE INVENTION

The invention may provide an improved method for cursive handwriting recognition. The invention may provide a method which quickly segments and recognizes the handwritten pattern. The invention may provide a method which does not require extensive learning and which does not need great processing power.

At least some of the above may be achieved by a method, a device or a computer program product. Specific embodiments of the invention are set forth below.

A method according to the invention may be used for recognition of a handwritten pattern that has one or more curves representing a plurality of symbols. The method may detect the handwritten pattern as a sequence of points along the one or more curves of the handwritten pattern, identify potential diacritics in the sequence of points of the handwritten pattern, select core points among the sequence of points. The core points may be selected for use in segmenting the handwritten pattern and recognizing these segments of the handwritten pattern as symbols, determining features of the one or more curves at or in the vicinity of each core point, assigning at least one feature associated with an identified potential diacritics to each core point of a subset of core points, and comparing the handwritten pattern to templates. Each template may represent at least one symbol or part of a symbol. Comparing to templates may be accomplished by stepwise analyzing the core points in sequence. The core points may represent possible segmentation points, and sequences of core points from a first possible segmentation point to a second possible segmentation point may represent possible symbols. Analyzing the core points may be performed by matching the features of sequences of core points that either start with the first core point or the last core point of a previous sequence of core points to templates and calculating a distance value, and assigning a cumulative distance value to the last core point in the matched sequence of core points. The cumulative distance value may be a sum of a distance value assigned to the first core point in the sequence and the calculated distance value, whereby a smallest cumulative distance value for all sequential core points is assigned to the last core point and corresponds to a sequence of matched templates which represent a plurality of symbols as a possible recognition result of the handwritten pattern.

The invention also provides a device for recognition of a handwritten pattern comprising one or more curves representing a plurality of symbols. Such a device may have a means for performing the acts of the above method.

The invention may be embodied as a computer program product, directly loadable into the internal memory of a data handling unit, comprising software code portions for performing the above-defined method.

By using the invention, a handwritten pattern representing several symbols may be quickly recognized. By using the core points both for segmentation and recognition, the calculations may separate the handwritten pattern and match the pattern with templates. Thereby, the process of comparing the handwritten pattern to templates is quick. After all core points have been analyzed, cumulative distance values may be assigned to the last core point, and each cumulative distance value may be associated with a sequence of templates that have been matched with separated parts of the handwritten pattern. Thus, the information assigned to the last core point could easily be used for obtaining possible recognition results of the handwritten pattern. Further, by identifying possible diacritics and assigning them to a subset of the core points, a high hit rate (i.e. finding the correct interpretation) may be facilitated and the recognition may still be very quick.

It has been realized that by selecting a limited number of possible segmentation points according to some criteria, the segments of the handwritten pattern may be recognized by using information related to these possible segmentation points only. Thus, it has been realized that there is no requirement to use neural networks or hidden Markov models in order to recognize cursive handwriting. Instead, possible segmentation points may be selected and the same possible segmentation points may be used for recognition of symbols within the handwritten pattern.

The selection of core points may discard a great number of points from the detected sequence. Thus, a manageable number of core points may be chosen, which should reduce the computational efforts needed for comparing sequences of core points to templates. It has been realized that a portion of the information in the detected sequence of points is redundant for recognizing the handwritten pattern. Therefore, discarding a significant number of points is not likely to affect the ability to correctly recognize the handwritten pattern. Also, since a limited number of points are used in the recognition, several templates may be used for recognizing the same symbol. Thus, the templates may represent allographs (i.e. different appearances or styles of writing the same symbol).

Advantageously, only core points that constitute possible segmentation points in the handwritten symbol need be selected. This keeps down the number of core points to be analyzed, whereby the method is fast.

As used herein, the term "symbol" should be construed as any form that has a specific meaning, such as a character (e.g. Latin, Chinese or any other kind) and a ligature between, before or after characters, or any punctuation mark. The term "character" is used herein to include letters and numbers, but the term is not limited to these. Further, the term "handwritten pattern" should be construed as the specific form of a symbol or sequence of symbols which has been written by a person.

According to an embodiment of the invention, the comparing is performed by forming a graph having nodes and arches connecting the nodes, wherein each node represents a core point corresponding to a possible segmentation point between two symbols in the handwritten pattern and each arch represents a path along a sequence of core points from one node to another node, said path corresponding to a possible symbol in the handwritten pattern, assigning at least one distance value to each path by matching the features of the sequence of core points to said templates, and determining at least the path through the graph from the first node to the last node with the smallest cumulative distance value, said path corresponding to a sequence of matched templates which represent a possible recognition result of the handwritten pattern.

By forming a graph, the stepwise analyzing of the sequential core points may be structured. This may imply that the analyzing may be quickly performed. Also, it is known how complex the needed calculations are and the time for performing the calculations can thus be easily estimated. Moreover, the results of cumulative distances may be structurally stored in connection to the nodes and arches. Further, the graph may be effectively used, since the size of the graph is easily handled because a great number of points may be discarded in the selecting of core points.

Several possible recognition results may be determined corresponding to paths through the graph having cumulative distance values below a threshold value. This may imply that comparing the handwritten pattern to templates may return a number of candidates as recognition results of the handwritten pattern. These candidates could be handled in several different manners. For example, the best candidate corresponding to the smallest cumulative distance value could be presented to a user. If this candidate is rejected, other candidates may be presented. Alternatively, several candidates may initially be presented.

The graph may be formed by sequentially adding core points as nodes and assigning at least one distance value to each path during formation of the graph. The required calculations may be performed as the graph is formed. This may imply that the possible recognition results may be obtained from the graph as soon as it has been formed.

Assigning at least one distance value may include assigning each path the lowest distance value corresponding to the template that best matches the features of the sequence of core points. This may imply that the graph always holds information of the templates that, according to the used features, best match the sequences of core points.

Assigning at least one feature associated with a detected diacritic may be performed before the act of comparing the handwritten pattern to templates. Thus, the diacritics may affect the distance value of the paths during the comparison of the core points to templates and thereby enable the recognition to be even more effective.

A number of core points that are selected may be limited by the shape of the one or more curves of the handwritten pattern. This may imply that the shape of the curves dictate the number of core points that are selected. In this way, a fewer number of core points may be selected where the shape of the curve is simple, whereas a greater number of core points may be selected for a complicated curve.

The number of core points that are selected may be limited to points holding information of directional changes of said one or more curves. Thus, only points in which the curves are bent or turned are used as core points. This enables the core points to describe the shape of the one or more curves, even though a limited number of core points are used.

Selecting core points may include selecting points which are local extreme points of said one or more curves in a direction orthogonal to a main writing direction of the handwritten pattern. A "local extreme point" is a point where a curve changes direction such that the derivative of the curve is zero. These selected core points may often correspond to possible segmentation points. Thus, this selection criterion may pick a set of core points which has a good probability of holding a major portion of the segmentation points. Further, these local extreme points are significant for shapes of symbols and are therefore also suitable for use in recognition.

The core points may be classified as subsets, such as N core points, S core points and M core points. An N core point may be a local maxima core point in a direction orthogonal to a main writing direction, an S core point may be a local minima core point in a direction orthogonal to a main writing direction and an M core point may be an intermediate core point to the N and S core points. By using subsets, it may be easier to assign a diacritic feature, because some subsets are more likely to have diacritic features. This should speed up the process of assigning a diacritic feature to core points.

According to an embodiment of the invention, the set of core points created by selecting local extreme points is extended by selecting one to three core points between each pair of local extreme points. These further core points may be selected by using other criteria. Such a set of core points may be suitable for use in segmenting and recognizing a handwritten pattern of Latin characters.

Selecting core points may include selecting points in which an absolute value of the derivative of the one or more curves exceeds a threshold value. This may imply that core points are selected where the curve or curves make a sharp turn. This provides useful information for recognizing a symbol and further may pick possible segmentation points.

Selecting core points may include selecting a core point where a deviation of the one or more curves from a straight line between two adjacent core points exceeds a threshold value. This may imply that a core point describing a curvature of the one or more curves is selected. Thus, information on the shape of the curve or curves may be preserved and used for recognition. The core points selected in this manner may also have a large probability of being segmentation points.

Selecting core points may include a combination of the selection criteria given above or may use further selection criteria that are likely to select possible segmentation points.

The determining of features may comprise determining a y-coordinate of the core point, said y-coordinate defining a position in a direction orthogonal to a main writing direction. This may be useful in distinguishing between characters that mainly differ in size.

Determining features may comprise determining a direction of the curve toward the core point and a direction of the curve from the core point. This may give information on the shape of the curve and may therefore be very useful in comparing a handwritten pattern to a template.

Determining features may include determining an x-coordinate displacement from a previous core point, said x-coordinate defining a position in a direction parallel with a main writing direction. This may imply that the core points are related to each other. Thereby, a template need not be displaced in order to be correctly matched to a sequence of core points.

It has been found particularly suitable for obtaining good recognition results to determine the x-coordinate displacement from the previous core point with highest value of the x-coordinate.

Determining features may comprise determining whether a pen has been lifted up or pressed down in the core point. This feature often indicates a segmentation point, but may also indicate a break between two strokes in a symbol. Therefore, this feature may be used for recognizing symbols that allow a pen being lifted or pressed down in the core point.

The distance value between a core point in the handwritten pattern and a point of a template may be calculated as a weighted sum of the distance between each feature of the core point and the point of the template. Thus, the determined features may be given different weights according to their importance for recognition. Further, all features may contribute to the distance value.

The handwritten pattern may be compared to templates, wherein a plurality of templates represent different appearances of the same symbol. As such different allographs may be recognized. Further, since a template may be represented by a limited number of features, it is possible to store quite a large number of templates while having a database of templates of a manageable size.

The possible recognition result of the handwritten pattern may be compared to a dictionary. This may imply that a candidate determined by comparing the handwritten pattern to templates may be further evaluated by being compared to a dictionary. Hereby, the candidate to be presented to a user may be, for example, the candidate having a smallest cumulative distance value or the candidate with smallest cumulative distance value among candidates that exist in the dictionary. However, this further evaluation using a dictionary is not necessary for obtaining possible recognition results. Therefore, comparing the handwritten pattern to templates may give recognition results without the use of a dictionary.

It is not necessarily an aim of the invention to always correctly interpret what is intended by the handwritten pattern. Thus, the method need not independently identify when the handwritten pattern lacks some information or contains erroneous information, such as when a character is left out in the handwritten pattern or when the handwritten pattern is misspelled. However, it may be used with other context and string matching routines so that words that are difficult to correctly recognize merely by examining the handwritten pattern itself may also be recognized.

Further, specific sequences of matched templates may be disallowed. This could be helpful in compensating for situations where the information in the handwritten pattern is not correct. However, it may also be used for improving the recognition results by rejecting impossible or unlikely candidates. For example, a sequence of two ligatures may be disallowed.

A weight may be given to the cumulative distance value for specific sequences of matched templates. This may imply that recognition results comprising unlikely sequences of templates may not be completely rejected, but may be given a weight to make it more difficult for these recognition results to have the smallest cumulative distance value.

The handwritten pattern may be written in cursive writing. The method is especially suited for recognition of handwritten patterns in cursive writing. However, the method may also be used for recognizing handwritten patterns where symbols are separately written. Especially, the method does not require that the handwritten pattern is written in one stroke.

BRIEF DESCRIPTION OF DRAWINGS

The invention will now be described in further detail by way of example with reference to the accompanying drawings, on which.

DETAILED DESCRIPTION OF A PREFERRED EMBODIMENT

Figure 1:
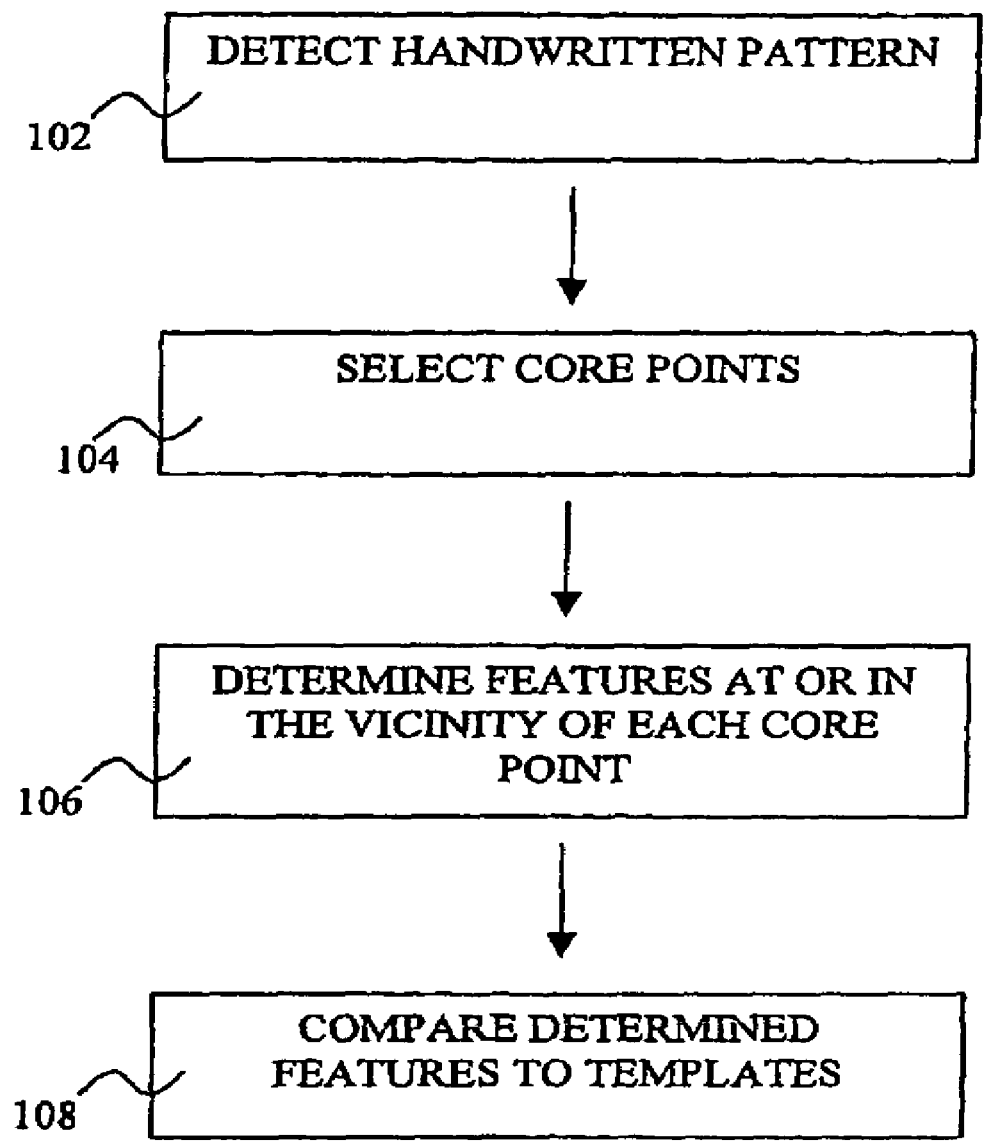
FIG. 1 is a flow chart of a method for recognizing a handwritten pattern.

Referring to FIG. 1, a method for recognizing a handwritten pattern will now be described. First, the handwritten pattern may be detected, step 102. Typically, a user may write the handwritten pattern with a stylus on a pressure-sensitive screen, whereby the handwriting is detected by sampling the position of the stylus at regular intervals. In this way, a time-sequence of points may be obtained. The handwriting may be detected in several other ways, for example, such as by using sensors that detect an electrical connection being formed between a pen and a writing surface or sensors detecting movements of a pen. Also, the handwritten pattern may be detected by scanning a paper on which the handwritten pattern has been written. Then, the handwriting may be detected as a sequence of points on a writing surface, wherein the sequence depends on where the points are placed in relation to each other, i.e. a spatial sequence of points.

After detecting the handwritten pattern, possible segmentation points, hereinafter called "core points", may be selected from among the sequence of points created when detecting the handwritten pattern, step 104. The core points may be selected in order to reduce the dimensionality of the handwritten pattern, i.e. the number of sampled points of a stroke in the pattern. Yet, the core points may be selected such that the handwritten pattern may be correctly recognized.

Figure 2:
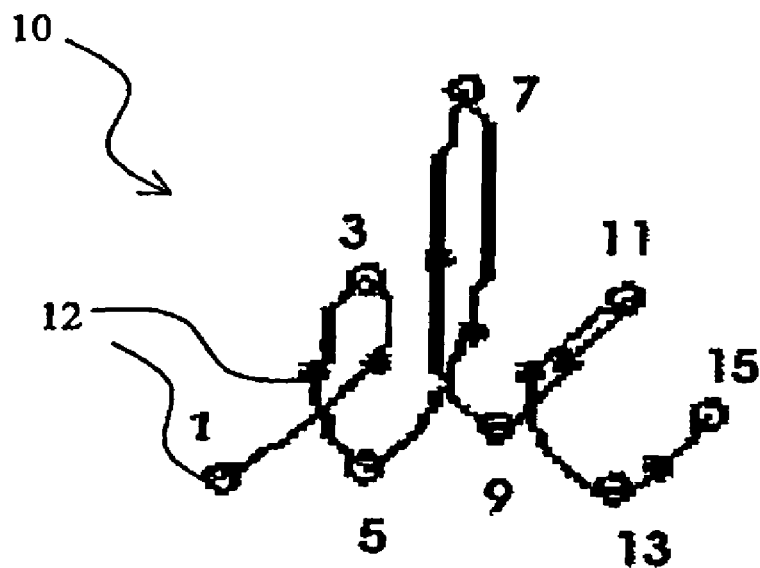
FIG. 2 is an example of a handwritten pattern indicating selected segmentation points to be used for comparing the handwritten pattern to templates.

FIG. 2 shows a handwritten pattern 10 forming the Swedish word "ek". In FIG. 2, the selected core points 12 are also indicated and every other core point is numbered. It is evident from FIG. 2 that the first part of this cursive word may have the appearance of the letter "d". The problem is that if the recognition method segments the word at the endpoint of that "d" into two letter segments, neither of these will contain the letters of the word that was intended. It is therefore clear that the recognition method should consider more than one segmentation possibility when segmenting cursive handwriting. Therefore, several core points 12 may be selected as possible points indicating a segmentation in the handwritten pattern 10 between two characters. Thus, the core points 12 may be selected to identify the correct segmentation of the handwritten pattern 10 into separate symbols or characters. However, the core points 12 may be used also for recognition of the segments of the handwritten pattern 10.

Selection of core points 12 may be accomplished without throwing away a segmentation point. However, the number of core points 12 defining potential segmentations of the handwritten pattern 10 may be selected in such a way as to keep down the number of core points 12 as much as possible. The selection of core points 12 therefore may use some selection criteria.

A number of core points 12 that are selected may be limited by the shape of the one or more curves of the handwritten pattern 10. This implies that the shape of the curves dictate the number of core points 12 that are selected. In this way, a fewer number of core points 12 may be selected where the shape of the curve is simple, whereas a greater number of core points may be selected for a complicated curve.

The number of core points 12 that are selected may be limited to points holding information of directional changes of said one or more curves. In this embodiment of the invention, only points in which the curves are bent or turned are used as core points. This enables the core points 12 to describe the shape of the one or more curves, even though a limited number of core points 12 are used.

According to a presently preferred embodiment, the following selection criteria may be used. The first selection criterion extracts the local extreme points in a direction orthogonal to a main writing direction. We denote these points by north (N) and south (S) core points, respectively. In the handwritten pattern 10 in FIG. 2, the N and S core points are marked by circles. Each pair of N-S points have been complemented by an additional one to three points lying in between the N and S core points. These latter points have been selected by two further criteria, a curvature and a sharpness criteria. We call the extra points middle (M) core points. In the handwritten pattern 10 in FIG. 2, the M core points are marked by solid dots. A curvature criterion may be used to determine whether the handwritten pattern 10 deviates significantly from a straight line between two adjacent core points. Then, an M core point may be selected at a position deviating most from the straight line. The sharpness criterion may be used to determine whether the handwritten pattern makes a sharp turn. Then, an M core point may be selected at a location where a sharp turn is determined. The decision whether the sharpness criterion is met may be made by calculating the derivative of the handwritten pattern 10 in each detected point. Where a sharp turn is made, the derivative assumes a large value. The sharpness and curvature criteria may be used for selecting several M core points between a pair of N-S core points. If no points are found according to the sharpness or curvature criteria, the intermittent point that corresponds to half the length of the curve between the N and S core points may be chosen as the M core point.

The method may further comprise determining features of the handwritten pattern at or in the vicinity of each core point, step 106. It is conceivable to use the coordinate values of the extracted core points 12 directly for recognition purposes. However, the surrounding to a core point 12 also may have some information about the shape of the handwritten pattern 10. In order to include this extra shape information, a set of five features for each core point may be determined according to an embodiment of the invention. Each core point 12 may be given a label from a label set according to how the core point was selected. Here, the three labels N, S and M are used. This label of the core points 12 may form the basis used for matching core point sequences to templates. Further, the features may comprise the directional vectors in towards and out from the core point 12, the y-coordinate value of the core point 12, i.e. the value in a direction orthogonal to the main writing direction, and the signed distance dx along an x-coordinate parallel to the main writing direction from the core point 12 to the previous core point furthest to the right. Moreover, it may be determined whether a pen has been lifted up or pressed down in the core point 12. This feature often indicates a segmentation point, but may also indicate a break between two strokes in a symbol. Therefore, the feature may be used for recognizing symbols that allow a pen being lifted or pressed down in the core point 12.

The determined features of the selected core points 12 of the handwritten pattern 10 may be compared to templates, step 108, in order to find a candidate or candidates for recognition of the handwritten pattern 10. The templates may be provided in a database and may be represented by features of sequential core points. Thus, the determined features may be directly matched with features of the templates. The database may comprise several templates representing allographs of the same symbol in order to recognize patterns even though users have different styles of writing. Further, the database may comprise templates representing ligatures, i.e. strokes that typically bind together two characters and are not part of the actual character. All characters in the middle of cursive words will have ligatures, whereas characters at the beginning of a word may or may not have a ligature. Cursive words may also end in a ligature. Some templates may represent a character with a ligature included. This may advantageously be used for templates of the characters "e", "r", "c", "x" and "s".

Figure 4:
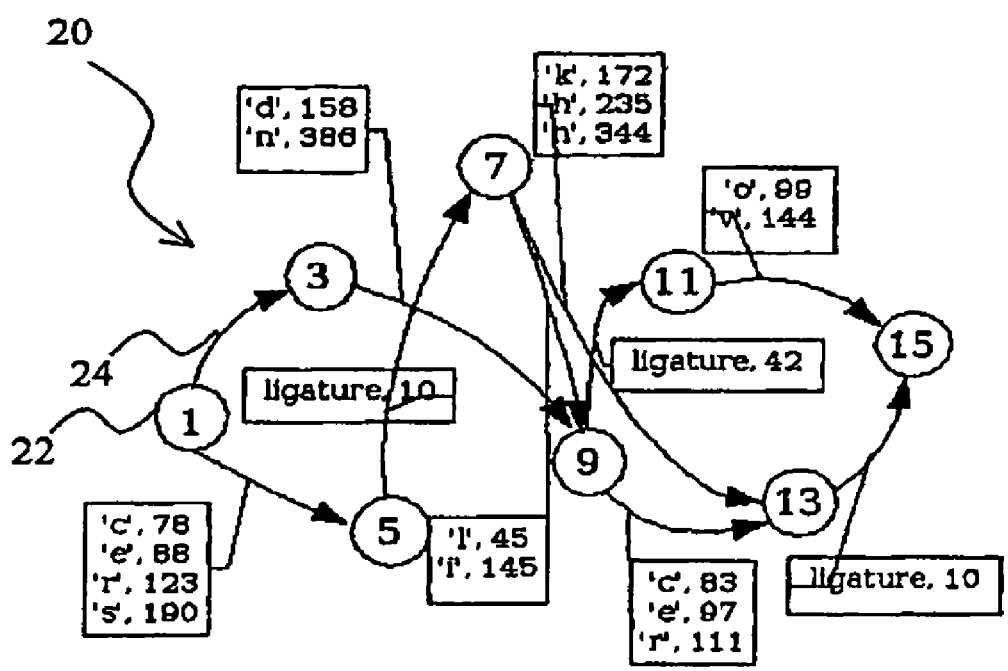
FIG. 4 is a chart of a graph that has been formed for determining distance values between templates and the handwritten pattern.
Figure 3:
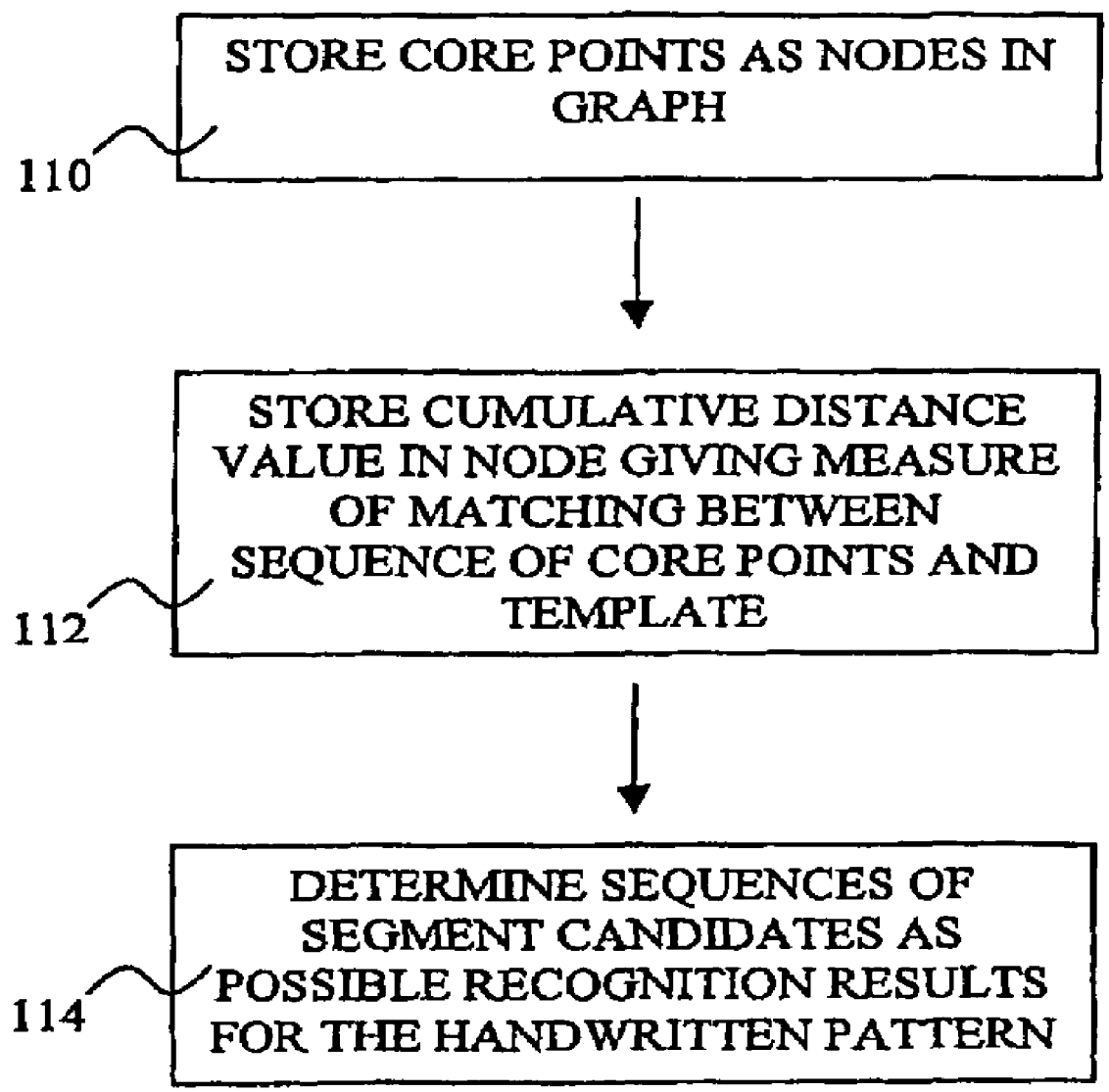
FIG. 3 is a flow chart of a method for comparing a handwritten pattern to templates.

Referring now to FIGS. 3 and 4, comparing the features of the selected core points 12 of a handwritten pattern 10 to templates will be described. The core points 12 may be considered potential segmentation points of the handwritten pattern 10. Further, a sequence of core points 12 from a first potential segmentation point to a second potential segmentation point may be considered a representation of a potential symbol in the handwritten pattern. Thus, the features of sequences of core points 12 may be compared to the templates.

The selected core points 12 may represent a relatively large number of different sequences of core points 12 that may be compared to the templates. In order to structure the comparison, the core points 12 may be analyzed in sequence. Starting at the first core point 12, any possible sequence of core points 12 may be matched with templates. The end core point 12 of a sequence that matches a template may be stored as a node in a graph, step 110. In this way, segment candidates associated with templates are picked as possible recognitions of the segment of the handwritten pattern 10 represented by the sequence of core points 12. A distance value giving a measure of the matching between the sequence of core points and the segment candidate may be stored in the node representing a path between the first core point and the node, step 112. When an attempt has been made to match all possible sequences of core points 12 from the first core point to the templates, further matching may be made starting at core points 12 which have been stored as nodes in the graph. Now, the distance values between templates and a further sequence of core points may be added to the first distance value stored at the starting node of the further sequence of core points. Thus, a cumulative distance value may be stored at nodes in the graph. In this way, an acyclic graph may be formed for all the core points 12 and the last core point in the graph will hold information of cumulative distance values for different paths through the graph. Now, sequences of segment candidates have been determined as possible recognition results of the handwritten pattern 10, step 114, and are represented as paths through the graph. The selected paths to be returned as recognition candidates for presentation to a user may be determined by comparison to a dictionary, as described in further detail below.

In FIG. 4, a segmentation graph 20 is shown representing a matching of the handwritten pattern 10 in FIG. 2 to templates. The segmentation graph 20 comprises nodes 22 represented as numbered circles and edges 24 between the nodes. As can be seen, there are several paths through the segmentation graph 20 representing different segmentations of the handwritten pattern. The matching of the handwritten pattern 10 to templates thus simultaneously defines possible segmentations of the handwritten pattern 10 and produces a measure of the resemblance between the segmented handwritten pattern 10 and a sequence of segment candidates.

A distance value between one core point in the handwritten pattern and one point in the templates may be a weighted sum of the absolute values of the differences between the features of the points. The distance value between a sequence of core points and a template may be the sum of the distance values between the individual points. However, the distances of core points forming nodes in the graph should only be calculated once. Thus, the distance between the core point forming the node and the templates may be assigned to a path to or from the node and may reflect a mean distance between the core point and both templates corresponding to paths to and from the node.

However, specific sequences of segment candidates may be disallowed. This could be helpful in compensating for situations where the information in the handwritten pattern 10 is not correct, for example, where the handwritten pattern has been sloppily written so that a character is missing. However, it may also be used for improving the recognition results by rejecting impossible or unlikely candidates. For example, a sequence of two ligatures may be disallowed. Further, a weight may be given to the cumulative distance value for specific sequences of segment candidates. This may imply that recognition results comprising unlikely sequences of templates are not completely rejected, but may be given a weight to make it more difficult for these recognition results to have the smallest cumulative distance value.

Figure 5:
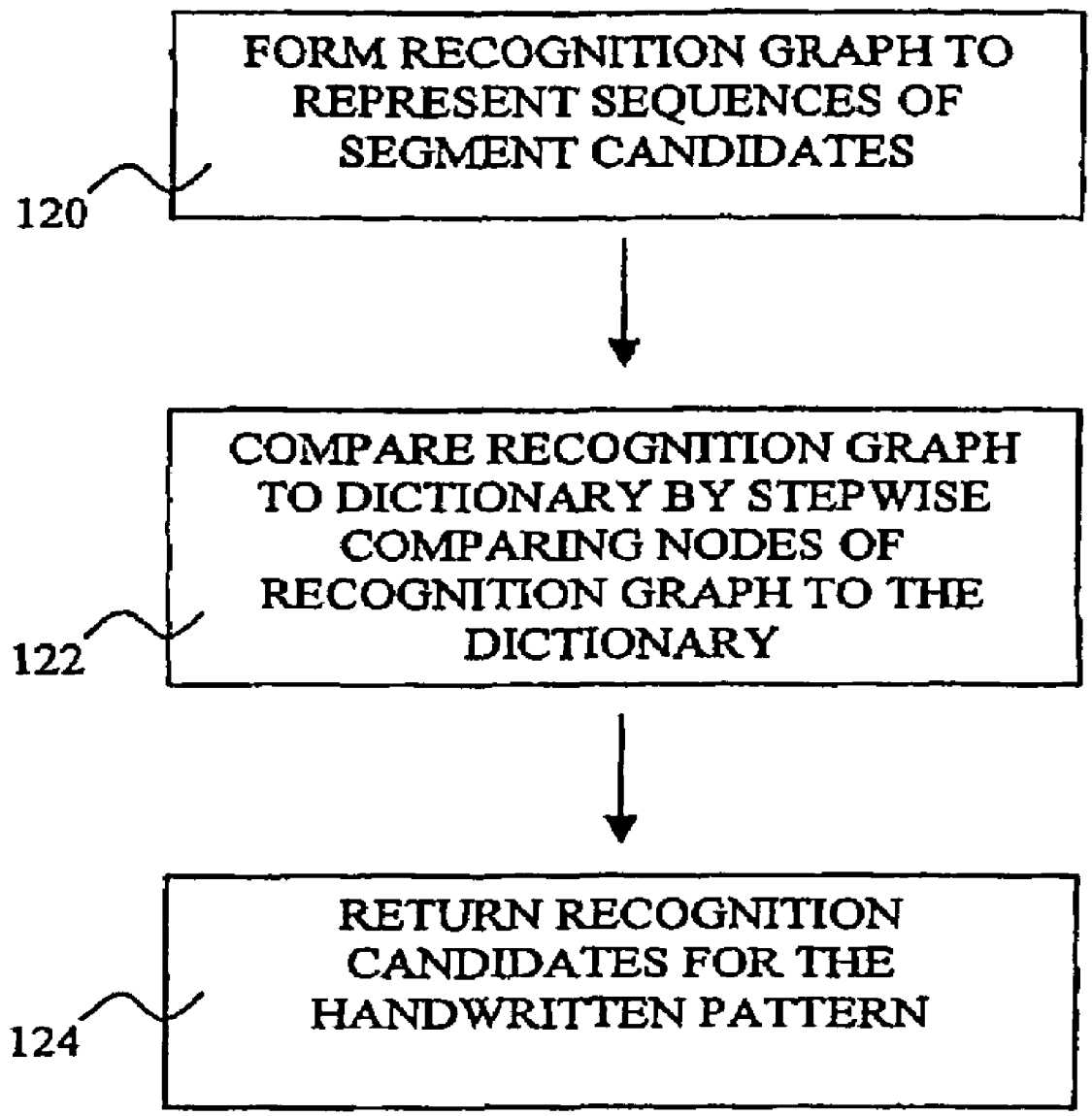
FIG. 5 is a flow chart of a method for comparing a recognition graph to a dictionary.
Figure 6:
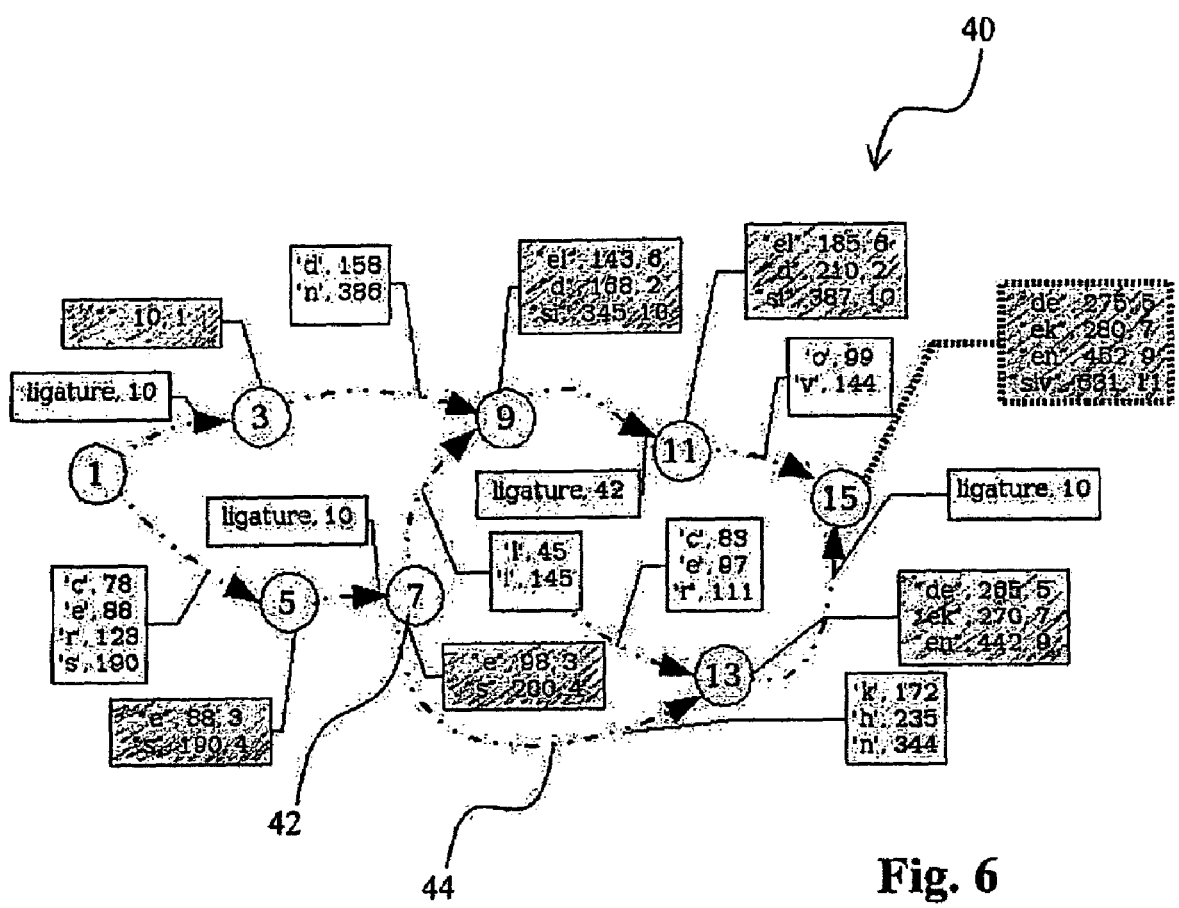
FIG. 6 is an example of a recognition graph being formed from possible recognitions of the handwritten pattern.
Figure 7:
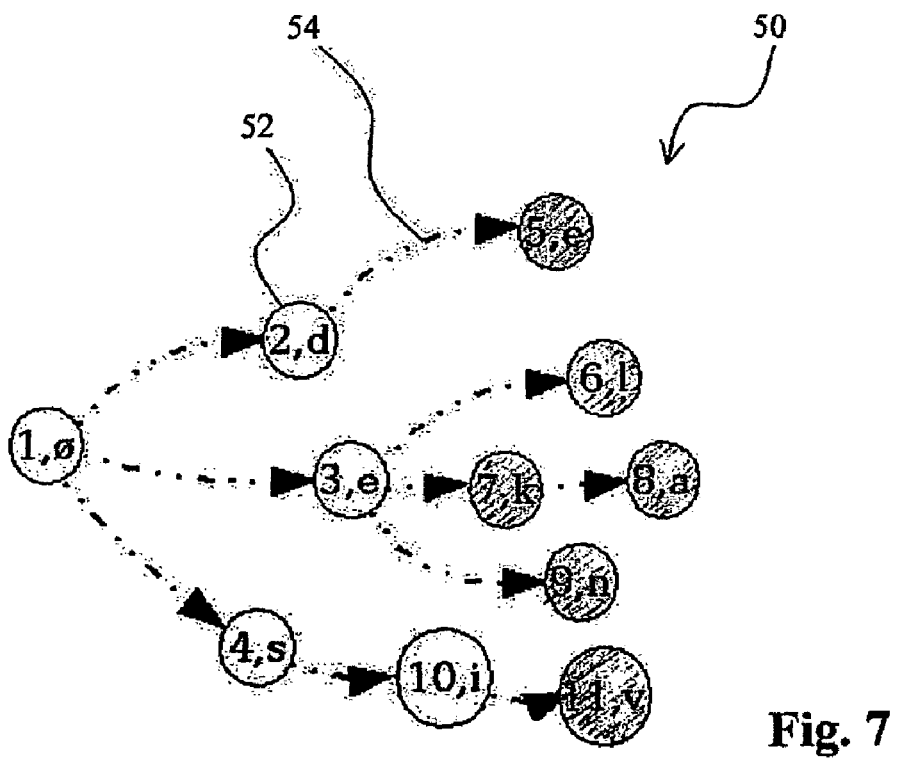
FIG. 7 is an example of a dictionary represented in the form of a Trie-graph.

A number of different possible recognitions of the handwritten pattern 10 have now been determined, as shown in FIG. 4. In order to pick out the most likely recognitions of the handwritten pattern 10, the sequences of segment candidates in the segmentation graph 20 may be compared to a dictionary. Referring now to FIGS. 5-7, an example of performing a comparison to a dictionary will be described.

In order to perform the comparison to a dictionary, a recognition graph 40 may be formed to represent the different possible sequences of segment candidates, step 120. Referring now to FIG. 6, a recognition graph 40 will be described. FIG. 6 shows an example of a recognition graph 40 created for the recognition of the handwritten pattern 10 shown in FIG. 2. The recognition graph 40 may be built up in a manner closely resembling the segmentation graph 20 used for recognizing segments of the handwritten pattern 10. However, the information included in the recognition graph 40 may be reduced. For example, the segmentation graph 20 may include segmentation points which do not fit the entire handwritten pattern. Such segmentation points are not part of a segmentation that properly segments the entire pattern, but are merely part of a segmentation that fits only a portion of the handwritten pattern. These segmentation points and incomplete sequences of segment candidates may be disregarded when forming the recognition graph 40. Further, the segmentation graph 20 may include different segmentations leading to the same sequence of segment candidates. These doublets of sequences of segment candidates may also be disregarded when forming the recognition graph 40.

The recognition graph 40 may be constructed of nodes 42 representing segmentation points that have been identified as possible segmentation points in comparing the handwritten pattern 10 to templates. The nodes 42 are shown as numbered circles in FIG. 6, being numbered according to the number of the core point 12 represented by the node 42. A node 42 may have references to subsequent nodes with information of the segment candidates for the segment of the handwritten pattern between the nodes 42. The references of the nodes 42 may be represented by edges 44. The edges 44 may include information of the symbol of the segment candidates and the distance value of matching the segment candidate to the segment of the handwritten pattern, as shown in unshaded boxes in FIG. 6. Each node 42 may also comprise a minimum and maximum number of segment candidates (not shown) that descend from the node 42. The recognition graph 40 may be constructed allowing a limited number of segment candidates into a node 42. Setting a maximum allowed number of segment candidates into a node 42 may limit the size of the recognition graph 40 and thereby limit the processing time when comparing the recognition graph 40 to a dictionary. As an alternative, only segment candidates having a distance value below a threshold value may be allowed. The recognition graph 40 may also be used for quickly returning the sequence of segment candidates best matching the handwritten pattern, without taking a dictionary into consideration. This may be achieved by setting the maximum number of segment candidates allowed into a node to 1. Then, the recognition graph 40 will only comprise the sequence of segment candidates having the lowest distance value.

In FIG. 7 a simplified example of a dictionary 50 is shown. The dictionary 50 shown includes only a few words, but indicates a presently preferred structure of the dictionary 50. The dictionary 50 is formed as a Trie-graph. The Trie-graph 50 comprises nodes 52 representing symbols. The nodes 52 may be connected by edges 54 such that allowed sequences of symbols are formed as strings through the Trie-graph 50. The root node represents an empty string, such that all sequences of symbols share the root node. The nodes that represent a last symbol in a sequence are shaded in FIG. 7. Each node 52 may also comprise information of a minimum and maximum number of symbols (not shown) that descend from the node 52.

The recognition graph 40 may be compared to the dictionary 50 by stepwise comparing the nodes 42 of the recognition graph 40 to the dictionary 50, step 122. Starting in the first recognition graph node, the validity of the segment candidates of the edges 44 from this node may be determined by checking whether there is a word in the dictionary 50 starting with the same symbol. Then, the edges from the first recognition graph node may be updated with information of the valid symbols, that is the segment candidates having a correspondence in the dictionary 50 are retained, whereas the other segment candidates are discarded. The updated information of the edges are shown in shaded boxes in FIG. 6. The edges are also updated with references to the nodes in the dictionary 50 corresponding to the respective position in the sequences of segment candidates in the recognition graph 40. The comparison is then continued through all the nodes 42 in the recognition graph 40, discarding all sequences of segment candidates having no correspondence in the dictionary 50. For each recognition graph node 42, the validity of the segment candidates of the edges from this node may be determined by checking whether there is a corresponding symbol in the edges from the node in the dictionary 50 referenced to by the edge into the recognition graph node.

With the information of the minimum and maximum number of symbols in a sequence of segment candidates, the validity check may also include checking whether these minimum and maximum number of symbols of a word may be met by the relevant node in the dictionary 50. If the length boundaries are not met, the sequence of segment candidates may be discarded.

Further, in order to control time complexity, an upper boundary for the number of references into the Trie-graph 50 for every node 42 in the recognition graph 40 may be set. Thus, control is gained over how much time the comparing of the recognition graph 40 to the Trie-graph 50 will take. However, there is a risk that sequences of segment candidates that have a bad initial match are discarded.

When all the nodes of the recognition graph 40 have been analyzed, the last node of the recognition graph 40 will hold information of the best recognition. candidates of the handwritten pattern 10 that are also present in a dictionary. The recognition candidates for the handwritten pattern 10 may now be returned, step 124, for being presented to the user. The recognition candidate having the lowest cumulative distance value may be presented to the user as an interpretation of the handwritten pattern. Alternatively, a number of recognition candidates may be presented to the user, such that the user may select the correct interpretation.

Figure 8:
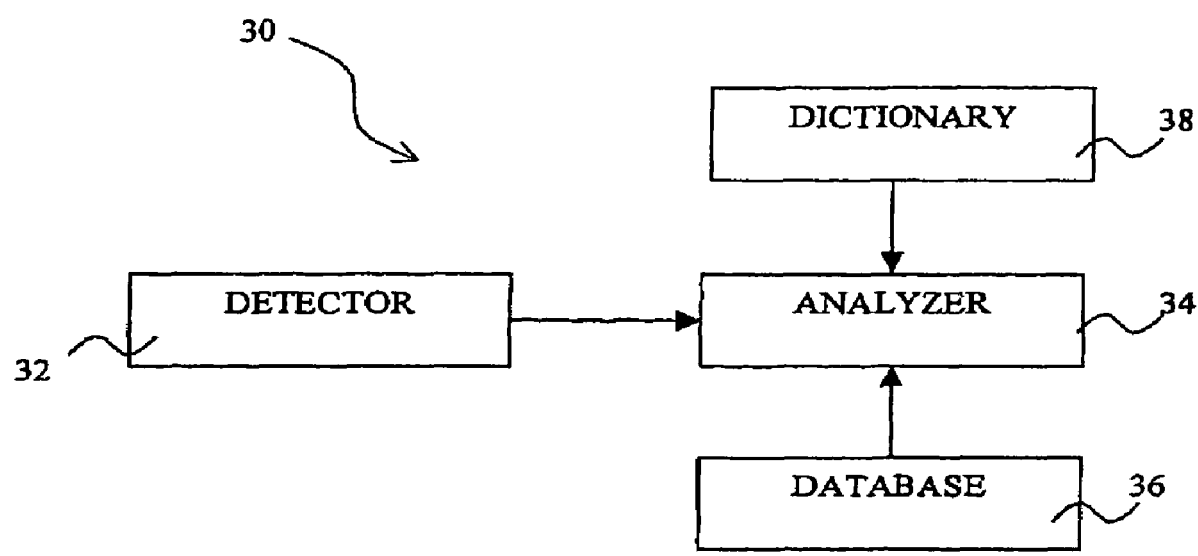
FIG. 8 is a schematic view of a device for recognizing a handwritten pattern according to an embodiment of the invention.

Referring now to FIG. 8, a device 30 for recognition of a handwritten pattern will be described. The device 30 may comprise a detector 32 for recording a handwritten pattern as a sequence of points. The detector 32 may be implemented as a pressure-sensitive screen on which a user may write. The device 30 further may have an analyzer 34 for analyzing the detected handwritten pattern. The analyzer 34 may be implemented as a program running on a central processing unit of a computer. The analyzer 34 may have a means for selecting core points of the handwritten pattern and means for determining features of the handwritten pattern at or in the vicinity of the core points. The device 30 further may have a database 36 comprising templates represented as features of core points. The analyzer 34 further may have means for calculating distance values between features of a sequence of core points of the handwritten pattern and templates. The analyzer 34 may be arranged to form a graph for structurally comparing the handwritten pattern to templates. The analyzer 34 further may be arranged to form a recognition graph representing sequences of segment candidates forming possible recognitions of the handwritten pattern. The device 30 further may have a dictionary 38 comprising a Trie-graph representing allowed words or sequences of symbols. The analyzer 34 further may be arranged to compare the recognition graph to the dictionary for determining the sequences of symbols that best match the handwritten pattern. These possible recognition results may be presented on a display, which may be separate from the pressure-sensitive screen or incorporated with the pressure-sensitive screen on which the handwritten pattern was entered.

According to another embodiment, diacritics of the handwritten pattern may be given special consideration in the implementation of the previously described methods and device. In the context of this application the term "diacritic" is to be interpreted as a mark or a stroke near or crossing a symbol wherein the mark or stroke in some cases indicates that the symbol with the mark or stroke is another symbol than the symbol without the mark or stroke, e.g. ê and e, ã and a, ö and o, t and l, and in some cases is a feature of the symbol wherein the symbol still may be interpreted as the correct symbol without the diacritic, e.g. i and j. In cursive handwriting many diacritics are drawn after the rest of the word has been written. The diacritics are important for the recognition. One reason for this is that a lot of segments in a cursive word may match a symbol without the diacritic, e.g. an "i" without the dot may be interpreted as being part of another character.

For segmentation based methods that decompose the cursive word into chronologically sorted character segments, e.g. methods described earlier in this application, it may be important to consider the diacritics so that correct recognition is achieved.

In one embodiment utilizing information of diacritics the information regarding diacritics is assigned as a feature to a subset of the core points, in step 106 in FIG. 1. Accordingly, the information relating to the diacritics is present in the core point and may thereby be utilized during recognition as a factor affecting the result from comparing potential symbols to templates.

A diacritic may be identified in the handwritten pattern as an unconnected ligature line, i.e. a stroke not connected to any segments and identified as a ligature.

Characteristics that may be used in the feature assigned to the core points of the subset of core points may be the position of the diacritic, i.e. x- and y-coordinates, the absolute distance from the specific core point to the diacritic, the distance from the core point to the diacritic in the x direction, the distance from the core point to the diacritic in the y direction, the length of the diacritic, the shape of the diacritic, etc. The feature relating to diacritics that is assigned to the core points may include only one of the above characteristics or a combination of a plurality of the characteristics.

The subset of core points to which the diacritics is assigned may be arranged so that it only includes core points 12 labeled N or M. This may make the method faster than if all core points would be included.

The diacritic features may be used during the sequential analysis of the core points 12 for penalizing the distance value of the present node 22 in the sequential analysis. For example, if the suggested symbol, i.e. candidate, for the present node 22 is an "i" and a diacritic is close to the core point 12 associated with the node 22, then the node 22 may be given a relatively small penalty. Greater distance between the core point 12 and diacritic may result in a greater penalty. A maximum penalty may be set to a value corresponding to the penalty given for a missing diacritic of a candidate that should have a diacritic and such a maximum penalty may be given to candidates where the distance to the diacritic exceeds a specific value. The use of diacritic features during the sequential analysis may make it possible to make the diacritics affect the cumulative distance value of a segmentation graph 20 during the forming of the segmentation graph 20. This is of particular interest for structurally simplistic characters such as "i" and "j", because when the diacritics are not considered, there is a risk that portions of other characters/symbols may be mistakenly interpreted as "i" or "j". Accordingly, by means of the scheme above, a path including "i" and/or "j" as a candidate/candidates and having a diacritic positioned within a reasonable distance from an initial core point of the candidate may be favored. The use of diacritic features during the sequential analysis may also be implemented for other symbols or characters.

A method utilizing information regarding diacritics in the recognition process may, according to one embodiment, be to determine the closest diacritic point for each core point 12 having the label N or M and associating a diacritic feature, as discussed above, with each such core point. According to another embodiment, the feature of the closest diacritic point may be assigned to each core point 12 having the label N or M and wherein the closest diacritic point is within a predetermined distance from the core point. After assigning diacritic features, during the construction of the segmentation graph 20 representing the segmentation of the handwritten pattern 10, segmentation matched to a symbol, i.e. a candidate symbol, that includes a diacritic may be penalized by a value relating to the distance to the starting N or M core point of the segmentation. In the embodiment where not all N and M core points necessary is assigned features of a diacritical, a maximum penalty may be given to a node that is supposed to have a diacritical and wherein the N or M core point of the candidate is not assigned a feature of a diacritical.

Further, candidate words, resulting from a path in the segmentation graph 20, that have diacritics where they are not needed may be penalized after matching such a candidate word with a dictionary. The use of a dictionary is described above in this application. One method that may be used to decide if the candidate word includes diacritics where they are not needed is to check if the candidate word includes too many diacritics. This may be achieved by comparing the number of diacritics included in the candidate word with the number of diacritics identified in the path resulting in the candidate word and then penalizing the surplus diacritics of the candidate word.

For example:

penalty=factor·$(A-B)$; for $A-B>0$ penalty=0; for $A-B<0$ $A$=max_number_of_diacritics(candidate word)

$B$=observed_no._of_diacritics(path resulting in candidate word)

The observed number of diacritics in the path resulting in the candidate word may be obtained by counting the number of unconnected ligature lines, i.e. strokes not connected to any segments and identified as ligatures.

According to yet a further embodiment, unused diacritics may be penalized by applying a diacritic match check between the resulting candidate word and the path resulting in the candidate word. This may be achieved by comparing the number of diacritics included in the candidate word with the number of diacritics identified in the path resulting in the candidate word and then penalizing the missing diacritics in the candidate word.

For example:

penalty=factor·$(B-A)$; for $B-A>0$ penalty=0; for $B-A<0$ $A$=number_of_diacritics(candidate word)

$B$=observed_no._of_diacritics(path resulting in candidate word)

By using this scheme the system is able to, for example, correctly recognize the word "blind" even in a case where the character "i" of the written text bears more resemblance to the letter "e", which could result in the word "blend", and even if the dot is somewhat misplaced.

It should be emphasized that the preferred embodiment described herein is in no way limiting and that many alternative embodiments are possible within the scope of protection defined by the appended claims.

The invention claimed is:

1. A method for use in a device for recognition of a handwritten pattern comprising one or more curves and representing a plurality of symbols, said method comprising:

detecting, by a detector of said device, the handwritten pattern as a sequence of points along the one or more curves of the handwritten pattern, identifying, by an analyzer of said device, potential diacritics in the sequence of points of the handwritten pattern, selecting, by said analyzer, core points among the sequence of points, wherein said core points are selected for use in segmenting the handwritten pattern and recognizing these segments of the handwritten pattern as symbols, determining, by said analyzer, features of the one or more curves at or in the vicinity of each core point, assigning, by said analyzer, at least one feature associated with a identified potential diacritics to each core point of a subset of core points, and comparing, by said analyzer, the handwritten pattern to templates in a database, each template representing at least one symbol or part of a symbol, said comparing comprising:

stepwise analyzing the core points in sequence, wherein core points represent possible segmentation points and sequences of core points from a first possible segmentation point to a second possible segmentation point represent possible symbols, said analyzing being performed by matching the features of sequences of core points that either start with the first core point or the last core point of a previous sequence of core points to said templates and calculating a distance value, and assigning a cumulative distance value to the last core point in the matched sequence of core points, said cumulative distance value being a sum of a distance value assigned to the first core point in the sequence and the calculated distance value, whereby a smallest cumulative distance value for all sequential core points is assigned to the last core point and corresponds to a sequence of matched templates which represent a plurality of symbols as a possible recognition result of the handwritten pattern.

2. The method according to claim 1, wherein said comparing is performed by forming a graph having nodes and arches connecting the nodes, wherein each node represents a core point corresponding to a possible segmentation point between two symbols in the handwritten pattern and each arch represents a path along a sequence of core points from one node to another node, said path corresponding to a possible symbol in the handwritten pattern, assigning at least one distance value to each path by matching the features of the sequence of core points to said templates, and determining at least the path through the graph from the first node to the last node with the smallest cumulative distance value, said path corresponding to a sequence of matched templates which represent a plurality of symbols as a possible recognition result of the handwritten pattern.

3. The method according to claim 2, wherein several possible recognition results are determined corresponding to paths through the graph having cumulative distance values below a threshold value.

4. The method according to claim 2, wherein said graph is formed by sequentially adding core points as nodes and wherein said assigning of at least one distance value to each path is performed during forming of the graph.

5. The method according to claim 2, wherein said assigning of at least one distance value comprises assigning each path the lowest distance value corresponding to the template that best matches the features of the sequence of core points.

6. The method according to claim 1, wherein the act of assigning at least one feature associated with a detected diacritic is performed before the act of comparing the handwritten pattern to templates.

7. The method according to claim 1, wherein a number of core points being selected is limited by the shape of said one or more curves.

8. The method according to claim 7, wherein the number of core points being selected is limited to points holding information of directional changes of said one or more curves.

9. The method according to claim 1, wherein said selecting of core points comprises selecting points which are local extreme points of said one or more curves in a direction orthogonal to a main writing direction of the handwritten pattern.

10. The method according to claim 9, wherein the core points are classified as N core points, S core points and M core points, wherein an N core point being a local maxima core point in a direction orthogonal to a main writing direction, an S core point being a local minima core point in a direction orthogonal to a main writing direction and an M core point being an intermediate core point to N and S core points, further comprising the act of selecting the core points of said subset of core points as N and M core points.

11. The method according to claim 1, wherein said selecting of core points comprises selecting points in which an absolute value of the derivative of the one or more curves exceeds a threshold value.

12. The method according to claim 1, wherein said selecting of core points comprises selecting a core point where a deviation of the one or more curves from a straight line between two adjacent core points exceeds a threshold value.

13. The method according to claim 1, wherein the determining of features comprises determining a y-coordinate of the core point, said y-coordinate defining a position in a direction orthogonal to a main writing direction.

14. The method according to claim 1, wherein the determining of features comprises determining a direction of the curve towards the core point and a direction of the curve from the core point.

15. The method according to claim 1, wherein the determining of features comprises determining a x-coordinate displacement from a previous core point, said x-coordinate defining a position in a direction parallel with a main writing direction.

16. The method according to claim 1, wherein the determining of features comprises determining whether a pen has been lifted up or pressed down in the core point.

17. The method according to claim 1, wherein the distance value between a core point in the handwritten pattern and a point of a template is calculated as a weighted sum of the distance between each feature of the core point and the point of the template.

18. The method according to claim 1, wherein the handwritten pattern is compared to templates, wherein a plurality of templates represent different appearances of the same symbol.

19. The method according to claim 1, wherein the possible recognition result of the handwritten pattern is compared to a dictionary.

20. The method according to claim 1, wherein specific sequences of matched templates are disallowed.

21. The method according to claim 1, wherein a weight is given to the cumulative distance value for specific sequences of matched templates.

22. The method according to claim 1, wherein the handwritten pattern is written in cursive writing.

23. A computer readable memory device having stored thereon instructions which, when executed by a computer, causes the computer to perform the method according to claim 1.

24. A device for recognition of a handwritten pattern comprising one or more curves and representing a plurality of symbols, said device comprising:

a detector for detecting the handwritten pattern as a sequence of points along the one or more curves of the handwritten pattern, an analyzer for identifying potential diacritics in the sequence of points of the handwritten pattern, said analyzer being further configured for selecting core points among the sequence of points, wherein said core points are selected for use in segmenting the handwritten pattern and recognizing these segments of the handwritten pattern as symbols, said analyzer being further configured for determining features of the one or more curves at or in the vicinity of each core point, said analyzer being further configured for assigning at least one feature associated with an identified potential diacritics to each core point of a subset of core points, and said analyzer being further configured for comparing the handwritten pattern to templates in a database, each template representing at least one symbol or part of a symbol, said comparing comprising:

stepwise analyzing the core points in sequence, wherein core points represent possible segmentation points and sequences of core points from a first possible segmentation point to a second possible segmentation point represent possible symbols, said analyzing being performed by matching the features of sequences of core points that either start with the first core point or the last core point of a previous sequence of core points to said templates and calculating a distance value, and assigning a cumulative distance value to the last core point in the matched sequence of core points, said cumulative distance value being a sum of a distance value assigned to the first core point in the sequence and the calculated distance value, whereby a smallest cumulative distance value for all sequential core points is assigned to the last core point and corresponds to a sequence of matched templates which represent a plurality of symbols as a possible recognition result of a handwritten pattern.

* * * * *